(12) United States Patent
Ustick

(10) Patent No.: X8855
(45) Date of Patent: May 29, 1835

(54) STRAW CUTTER

(76) Inventor: Stephen Ustick

Stephen Ustick
Strawcutter

The Schedule referred to in these Letters Patent, and making part of the same, containing a description in the words of the said Stephen Ustick, himself, of his improvement in the Strawcutter —

To all to whom these Presents shall come
Be it known, that I, Stephen Ustick of Philadelphia in the county of Philadelphia and state of Pennsylvania, have invented a new and useful improvement on my improvement on the Strawcutter Patented Feby. 5th. 1835, which was an improvement on a strawcutter for which I obtained from the United States Letters Patent bearing date Octo. 3d. and that the following is a full and exact description of the construction and operation thereof — I have a frame 2 ft. 6 in. — high — the front parts of which extend 1 ft. 3 in — higher — The front posts are 1 ft. asunder and likewise the back posts — The latter are 2 feet from the former and connected therewith by rails, near their lower ends, and by boards which form the side of the trough at their upper ends — The one at the left side of the Machine is 10 in, — and the other 8 in, — wide — Their upper edges are level with each other — The back posts are connected at bottom by a sill and below the sides of the trough by a rail — The front ones are connected at their upper end by a cap, and at their lower end by a sill which extends beyond the left hand one and receives a post that is 6 inches from said left hand post and which is connected at its upper end therewith by a rail that is framed on the latter and into the former. Said rail serves as a foundation for a box of a crank which is described below — The foundation for the other box is a cap of a post which is square with the last specified a-e, and connected therewith by a rail below the sweep of the crank and is stayed at bottom by a sill framed on it at one end and half lapped with the front will above described - The trough is extended by a separate
trough 2 ft 6 in - long - On the outside of the sides of which, near
the upper edge at front are iron hooks in the form of an L fastened
by means of wood screws, the elbows fit against the inside of the back
posts and the posts of the shafts connected with them fit in the tops
of the posts - The trough is made in two parts as described above
for the purpose of the back part being detached when the machine
is not in use, so that it may occupy but little space - The bottom
of the front part of the trough is in 3 pieces, the first and third are
stationary but the second one which I call the lower feeder fits in
groves of the sides which guide it as it vibrates, as described below
The first piece is 8 in. and the second 9 in. wide, and the
third one of such width as to allow a vibration of 2½ in. —
of the second. The space in front of the lower feeder or second piece of
bottom is covered by a piece of sheet iron which is screwed on top of the said
piece at front, and which extends over the first piece - The back space is
covered in like manner by a piece of sheet iron which is screwed on the
third piece of bottom - The bottom of the trough is of equal distance
from the bottom edges of the sides so that the part of the left side of
the machine is 1 inch lower than that at the right side thereof in con-
sequence of the different widths of the sides as described above
There is an opposing edge in the front end of the trough with the
topside of its base ranging with the topside of the bottom of the
trough - The perpendicular posts are let into the posts and fast-
ened by wood screws - The bottom and the opposing edge are lower
at one side of the trough than at the other to allow the knife which is des-
cribed below and which has a horizontal position to pass the opposing
edge gradually to prevent its catching thereon - There is a knife on a
cast iron frame it being in a diagonal position therewith, and fastened
by means of screws one in each end, and in the middle thereof. The
heads of said screws are sunk in the face of the knife, - and there
are nuts on their tail end which come against the face of the knife frame
The ends of the knife at the back edge rest on a lip of the frame, and at the front edge on screws through the frame by which its set against
the opposing edge is regulated - The Knife frame has tongues in its side
edges at the corners which fit in grooves of cast iron pieces which are fast
ened by means of wood screws on ribs that are secured to the front of the
machine by means of bolts with taps - Said rails have such an oblique
portion as to give the Knife a horizontal position - The Knife frame
is vibrated backwards and forward by a crank and pitman, there
being a balance wheel on the front end of the crank which has a
handle in one of its spokes, the crank works in boxes which are
screwed to the caps described above. The pitman is connected with
the Knife frame by a pin in the lower corner of the latter which is
square with it - There is a board which I call the compresser, which
is 8 ins. wide, with tongues on its ends that slide in perpendic-
ular grooves in the front posts which run from their upper ends
as low down as to where the Knife rises - To permit the com-
presser to descend to near the bottom of the trough, the tongues only
run part of the way down by means of a bar which is cast in the
Knife frame is immediately back of the Knife coming under a
friction wheel on the face of the compresser which is on a flat
head pin that runs through the latter and a block on its back
side, the compresser is raised with the Knife by each revolution
of the wheel, and by a serpentine spring which is screwed to the cap
of the front posts bearing on the upper end of a perpendicular shaft
which is through the cap of the front posts, the lower end of which
fits in the upper edge of the compresser it is brought down tight on
the straw as the Knife descends its lower edge being a little lower
than the edge of the Knife - There is a cast iron box which I call
the upper feeder over the middle of the lower feeder and which
weighs 12 lbs - the bottom of which has 3 rows of peaked knobs
on it lengthwise, and which are in zigzag position crosswise of
the box - Said box has one end of elbows riveted to its ends on the
outside the other ends terminate near the front posts above the
sides of the trough and fit on pivots of cast iron arms, which are screwed to blocks that are fastened on the lowerside of the lower feeder by means of wood screws. The feeder is made in box form to receive addition al weight when required. There is a screw crosswise of the machine which works on a pivot that is in the under side of a block which is fastened to the outside of the side of the trough that is nearest the crank. The pivot has a head with a square shoulder to support the lever. There is a shaft which works on a pivot of an elbow of the back end of the above described crank, the upper end of which works on a pivot in the end of a lever that works on a pin, one end of which is in a cap of the front post contiguous thereto and the other end in a lip of a block, which comes over the lever, the block being fastened to the posts by means of bolts with taps. The lower end of the above specified shaft is connected with a frame 3 inch. wide and 6 inch. deep inside, which is guided by a slit of a piece of iron that is fastened to the backside of the left hand front trough post, and the crankpost which is straight with it by means of screws through short elbows from it. On the face of the shaft at its lower end there is a knob running downward the outside of which works against a slope ledge on the upperside of the lever, where the pivot of the elbow of the crank is near its lowest point. The slope commences at a point of the lever which is 3 in. from a line which is perpendicular with the crank & terminates with the said line. The ledge is extended by a counter-slope which is calculated as a guide for the said knob in case of the crank at any time being turned backward. There is a straight ledge which is square with the trough, when the knob gets to the peak of the above described ledge, against which the inside of the knob slides after it ceases to act on the slope to prevent jarring or jostling of the lever. Said ledge extends 3 in. each way from the peak of the other. The ledges are lower in the centre than at the ends, corresponding with the direction of the crank. There are similar ledges on the lower side of the lever but which have a counter position, against which a knob slides which is on one end of an elbow the other end of which is riveted to the lower end of the frame which is connected with the crankshaft. By the alternate action
of the above described knobs on the ledges, there is a vibrating motion
given to the lever which causes the feeders above described to vibrate
backwards and forwards there being a perpendicular pivot in the
end of the lever under the trough that works in a slit, that is
crosswise of the trough, of a piece of iron from which there is an
elbow running backward, and which is screwed to the lower feeder.
The said pivot is moveable in a slit of the lever by means of a tap
on its end under the latter, the part in the slit being flat and
having a shoulder above it. This is to regulate the feed of the
straw as may be required, by varying the pivot from the fulcrum.
The upper feeder is elevated by means of a chain which is connected
with it at one end and which runs over a pulley that is in an upright
which is supported by a bar that is fastened in the top edges of
the trough sides being connected at its other end with the inside
end of the lever which is connected with the upper end of the
crankshaft. The upward motion of the upper feeder and that of
the knife are alternate. The forward motion is given to the
feeders when the knife and compresser are up and the backward
motion when they are down. Hence when the feeders push the
straw forward, the compresser descends and holds the straw tight
while the knife cuts it off and when the knife and compresser as-
cend above the straw it is again pushed forward by the feeders
and so on in alternate succession.

What I claim as my invention, is the cast iron box hung
as above described, the arrangement of the machinery which
gives motion to the feeders as above described, and the application
of the bar of the knife frame and the friction wheel which
cause the elevation of the compresser as described above. In
Testimony that the above is my invention I have hereunto set
my hand and seal this 12th day of May 1835.

Witnesses
C. H. W. Wharton
Charles Bell
(1216 words)

Stephen Ustick
[illegible]